United States Patent
Ajmera et al.

(10) Patent No.: US 10,013,485 B2
(45) Date of Patent: *Jul. 3, 2018

(54) CREATING, RENDERING AND INTERACTING WITH A MULTI-FACETED AUDIO CLOUD

(75) Inventors: Jitendra Ajmera, New Delhi (IN); Om Dadaji Deshmukh, New Delhi (IN); Anupam Jain, New Delhi (IN); Amit Anil Nanavati, New Delhi (IN); Nitendra Rajput, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/600,951

(22) Filed: Aug. 31, 2012

(65) Prior Publication Data

US 2014/0006015 A1 Jan. 2, 2014

Related U.S. Application Data

(63) Continuation of application No. 13/538,988, filed on Jun. 29, 2012.

(51) Int. Cl.
*G10L 15/26* (2006.01)
*G06F 17/30* (2006.01)
*G10L 15/04* (2013.01)

(52) U.S. Cl.
CPC ........ *G06F 17/30775* (2013.01); *G10L 15/04* (2013.01)

(58) Field of Classification Search
CPC ............. G06F 17/218; G06F 17/30696; G06F 17/3079; G06F 17/30787; G06F 17/241; G06F 17/30843; G06F 3/0481
See application file for complete search history.

(56) References Cited

U.S. PATENT DOCUMENTS

| | | | |
|---|---|---|---|
| 6,003,027 A * | 12/1999 | Prager | G06F 17/30705 |
| 7,299,179 B2 * | 11/2007 | Block | G10L 15/32 704/254 |
| 8,374,865 B1 | 2/2013 | Biadsy et al. | |
| 2002/0099547 A1 * | 7/2002 | Chu | G10L 13/07 704/260 |
| 2002/0198719 A1 | 12/2002 | Gergic et al. | |
| 2004/0210443 A1 | 10/2004 | Kuhn et al. | |
| 2005/0107129 A1 * | 5/2005 | Kaewell | H04M 19/044 455/567 |
| 2006/0008781 A1 * | 1/2006 | Townshend et al. | 434/178 |
| 2007/0021956 A1 * | 1/2007 | Qu et al. | 704/8 |
| 2007/0271224 A1 | 11/2007 | Essafi et al. | |
| 2008/0109223 A1 * | 5/2008 | Hirota | G10L 15/22 704/249 |
| 2008/0162125 A1 * | 7/2008 | Ma et al. | 704/222 |

(Continued)

OTHER PUBLICATIONS

Ajmera, Jitendra et al., "A cross-lingual spoken content search system," Interspeech 2011 12th Annual Conference of the International Speech Communication Association, Aug. 27-31, 2011, Florence, Italy, 5 pages.

*Primary Examiner* — Jakieda Jackson
(74) *Attorney, Agent, or Firm* — Ference & Associates LLC

(57) ABSTRACT

Methods and arrangements for effecting a cloud representation of audio content. An audio cloud is created and rendered, and user interaction with at least a clip portion of the audio cloud is afforded.

19 Claims, 5 Drawing Sheets

(56) References Cited

U.S. PATENT DOCUMENTS

| | | | |
|---|---|---|---|
| 2008/0312926 A1* | 12/2008 | Vair et al. | 704/249 |
| 2009/0248399 A1* | 10/2009 | Au | G06F 17/27 |
| | | | 704/9 |
| 2009/0306959 A1 | 12/2009 | Rappoport et al. | |
| 2009/0313019 A1* | 12/2009 | Kato | G10L 17/26 |
| | | | 704/254 |
| 2011/0040562 A1* | 2/2011 | Doyle et al. | 704/251 |
| 2011/0055227 A1* | 3/2011 | Igarashi | H04N 7/15 |
| | | | 707/750 |
| 2011/0279638 A1* | 11/2011 | Periyannan et al. | 348/14.09 |
| 2012/0136664 A1* | 5/2012 | Beutnagel et al. | 704/260 |
| 2012/0272185 A1* | 10/2012 | Dodson et al. | 715/810 |
| 2012/0323575 A1* | 12/2012 | Gibbon et al. | 704/246 |
| 2012/0323897 A1 | 12/2012 | Daher et al. | |
| 2012/0324504 A1* | 12/2012 | Archer et al. | 725/30 |
| 2013/0143183 A1* | 6/2013 | Zilberman | 434/157 |
| 2013/0158997 A1* | 6/2013 | Natarajan | G10L 15/28 |
| | | | 704/240 |
| 2013/0179995 A1* | 7/2013 | Basile et al. | 726/32 |
| 2013/0246062 A1 | 9/2013 | Avargel et al. | |
| 2013/0262127 A1 | 10/2013 | Goldstein et al. | |
| 2013/0289989 A1* | 10/2013 | Biadsy et al. | 704/243 |

* cited by examiner

Audio cloud

FIG. 3

Table 301:

| | | |
|---|---|---|
| M-P-EY-K-AA-P-AA-S-OW-AX | 11 | 0.861599951115213 |
| EY-M-P-EY-K-AA-P-AA-S-AX | 7 | 0.862881071530923 |
| M-P-EY-K-AA-P-AA-S-AX | 11 | 0.868528024506074 |
| EY-K-AA-P-AA-S | 24 | 0.869976114662628 |
| EY-M-P-EY-K-AA-P-AA-S-OW | 7 | 0.893962330572651 |
| K-AA-P-AA-S-OW | 8 | 0.896535458854846 |
| M-P-EY-K-AA-P-AA-S-OW | 11 | 0.903357593141122 |
| O-EY-K-AA-P-AA-S | 10 | 0.905896055405226 |
| P-EY-K-AA-P-AA-S | 12 | 0.912881013924748 |
| EY-M-P-EY-K-AA-P-AA-S | 7 | 0.947217401128478 |
| M-P-EY-K-AA-P-AA-S | 11 | 0.965224953381981 |
| K-AA-P-AA-S | 8 | 0.995156516200018 |

Table 303:

| | | |
|---|---|---|
| EY-V-AA-T-AX-V-AX-CH-AX-M | 18 | 0.906240145130663 |
| R-OW-P-AA-N-AX-EY | 9 | 0.916357562465197 |
| OW-P-AA-N-AX | 7 | 0.917439159286986 |
| AE-R-OW-P-AA-N | 7 | 0.917456591516949 |
| AE-R-OW-P-AA-N-AX | 7 | 0.928368052000051 |
| R-OW-P-AA-N | 9 | 0.928610513039233 |
| R-OW-P-AA-N-AX | 9 | 0.929484181588857 |
| AX-V-AX-CH-AX-M-AA | 13 | 0.930913659111444 |
| AK-V-AK-CH-AX-M | 13 | 0.941425300236434 |
| K-AA-P-AA-S | 8 | 0.995156516200018 |

Table 305:

| | | |
|---|---|---|
| AA-IH-L-EY-K-AX-P-AA-S | 8 | 0.900842571689672441 |
| EY-K-AX-P-AA-S | 6 | 0.902271056374634 |
| L-EY-K-AX-P-AA-S-AA | 18 | 0.915975402230325 |
| EY-K-AX-P-AA-S-AA | 6 | 0.913773509079623 |
| AA-DH-AA-L-EY-K-AX-P-AA-S | 8 | 0.914991440689609 |
| EY-K-AX-P-AA-S-AA-B-IY-AX | 6 | 0.912973336035964 |
| AA-L-EY-K-AX-P-AA-S-AA | 10 | 0.910401709046005 |
| DH-AE-L-EY-K-AX-P-AA-S | 9 | 0.923505822572611 |
| L-EY-K-AX-P-AA-S-AA-B | 18 | 0.935034620448643 |
| EY-K-AX-P-AA-S-AA-B-IY-AA | 6 | 0.941272962964548 |
| IH-L-EY-K-AX-P-AA-S-AA | 7 | 0.942633860202772 |
| AA-L-EY-K-AX-P-AA-S-AA-B | 10 | 0.959415651822877 |

CREATING, RENDERING AND INTERACTING WITH A MULTI-FACETED AUDIO CLOUD

CROSS REFERENCE TO RELATED APPLICATION

This application is a continuation of U.S. patent application Ser. No. 13/538,988, entitled CREATING, RENDERING AND INTERACTING WITH A MULTI-FACETED AUDIO CLOUD, filed on Jun. 29, 2012, which is incorporated by reference in its entirety.

BACKGROUND

Conventionally, tag or word clouds are known. This helps to identify frequently used words in a text document. Typically, the words are arranged arbitrarily in a "weighted" representation, wherein font size depicts a frequency of occurrence in a document. A bigger font corresponds to a more frequently used word, and a smaller font to a less frequently used word. However, arrangements such as these are of little use in a variety of scenarios where a solely visual representation is not available or otherwise difficult to access or process.

BRIEF SUMMARY

In summary, one aspect of the invention provides a method comprising: creating an audio cloud; rendering the audio cloud; and affording user interaction with at least a clip portion of the audio cloud.

A further aspect of the invention provides a method comprising: inputting a rendered audio cloud into a user interface; and interacting with at least a clip portion of the audio cloud.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 3 provides an example of sub-word recognition applied to audio data.

DETAILED DESCRIPTION

Figure 1:
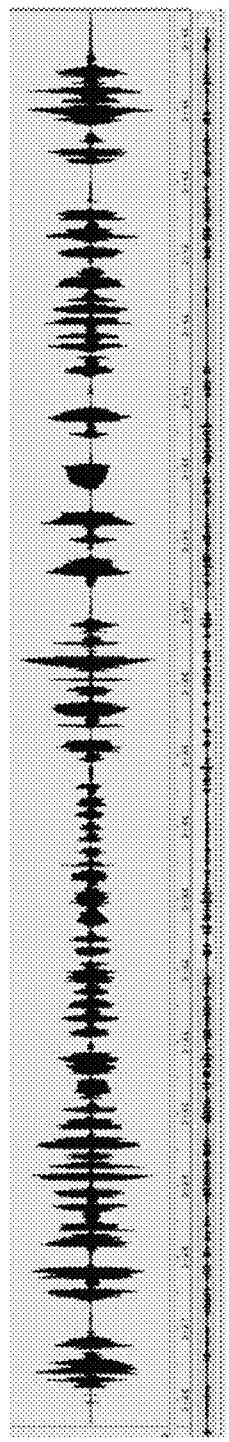
FIG. 1 provides a representation of an audio signal.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

Figure 2:
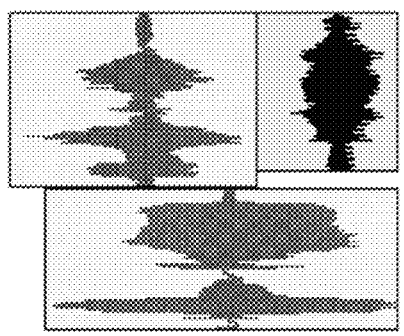
FIG. 2 provides a visual representation of an audio cloud.

FIG. 1 provides a representation of an audio signal, and FIG. 2 provides a representation of a speech cloud. In accordance with at least one embodiment of the invention, a multi-faceted audio cloud is generated and rendered, wherein an audio cloud provides prominent phrases or audio segments presented in some order of prominence. Interactivity for the cloud can also be provided.

In accordance with at least one embodiment of the invention, rich para-lingual information present in speech/audio is utilized. "Language agnostic" methods can be employed by way of bypassing limitations in automatic speech recognition (ASR), and a wide range of users can be catered to, from POTS ("plain old telephone service", or landline telephony) to users of smart-devices. Possible applications include spoken web, call/contact centers and the music industry.

It can be recognized, in a context of at least one embodiment of the invention, that ASR capabilities are not available for several languages. Further, the accuracy of ASR systems is sensitive to dialects, accents, vocabulary, and other linguistic elements. Substantial resources may well be needed to build new ASR arrangements (or modifying existing ones).

As such, in accordance with at least one embodiment of the invention, speech analysis/comparison techniques can ensure wide-spread applicability, and language-independent sub-word units can be recognized.

In accordance with at least one embodiment of the invention, a two-step process is undertaken. In a first step, audio is segmented into units and, in a second step, units that are "prominent" are identified. Audio segmentation can involve voice-activity-detection (VAD) techniques, treating a contiguous chunk of speech as a unit. Alternatively, syllable segmentation techniques can be used where each syllable or syllable-like entity is treated as a unit. In another variant, statistical methods (e.g., sub-word ASR) can be used to estimate identity and boundaries of sub-word units. These techniques could be used alone or in any combination, and other techniques are certainly conceivable.

FIG. 3 provides an example of sub-word recognition applied to audio data, in accordance with at least one embodiment of the invention. Here, an English sub-word recognition system is used on Gujarati data; pronunciation variations can also be captured in such an arrangement. (For background purposes, an illustrative example of a sub-word recognition system may be found in Jitendra Ajmera, Ashish Verma: "A Cross-Lingual Spoken Content Search System," *INTERSPEECH* 2011: 2257-2260. This publication shows that an English speech recognition system can be used to recognize Gujarati words such as shaakbhaji or khatarnaak.) As shown, indicated at 301, 303 and 305 are three separate audio documents (e.g., which each could be embodied by a customer-operator interaction over the course of a telephone call). Here, "K-AA-P-AA-S" is recognized as a prominent sub-word. In the first column shown in each document 301/303/305, different patterns are shown that were detected in the course of a conversation. In the second column, an integer number indicates the number of times that the pattern was detected in the document, while the third column indicates a probability with which the pattern was found at multiple places in the document. Probabilities are shown here in ascending order. In some lines, above a predetermined probability threshold, "K-AA-P-AA-S" is shown in bold. The threshold can differ for different documents, but for comparative purposes it can be preferable to keep the threshold at a consistent level across documents. (It should further be appreciated that the table-like renditions shown at 301/303/305 in FIG. 3 are mainly for illustrative purposes, inasmuch as the values in the tables can be stored in a database table or in any other data structure. However, a report can certainly be prepared from such data in a manner that appears similarly to the renditions shown in FIG. 3, or in any other suitable manner.)

In identifying units that are prominent, in accordance with at least one embodiment of the invention, unit-comparison can be used to detect units that are repeated. Employable here are frame-level speech features and Dynamic Time Warping (DTW), as well as unit-level speech features and standard distance measures. There can also be employed aggregate-level analysis of sub-word units estimated by statistical sub-word ASR. TF-IDF (term frequency—inverse document frequency) operations can be performed to discard non-informative units (if the corpus is available), else there can just be used the repetition score to identify prominence. A higher score points to more prominence.

With regard to a multi-faceted cloud, in accordance with at least one embodiment of the invention, it can be noted that speech carries not just linguistic information but is also rich in para-lingual information: speaker characteristics (age, gender, emotion, dialect . . . ), conversation style (multi-party vs. monologue, casual vs. formal . . . ). The same linguistic message from a friend vs. from a stranger could convey a different meaning/value. The significance of prominence can vary based on the time of prominence of an audio-unit. It can thus be appreciated that every audio unit is likely to have facets such as these and others as meta-data.

Cloud rendering, in accordance with at least one embodiment of the invention, can be carried out in a variety of ways. Generally, different aspects of audio rendering can be used to convey various facets of the audio cloud, such as: a volume of rendered units corresponding to occurrence frequency in the audio clip; a representative unit rendered corresponding to a speaker who spoke that unit most often in the clip; a perceived distance/location of the unit corresponding to a social-network closeness of the listener and the unit-speaker; a perceived direction of the rendered unit corresponding to a time of occurrence of the unit in the clip (e.g., audio played from the left channel corresponding to a clip occurring at the beginning of the audio and right channel corresponding to a clip occurring at the end of the audio). Other such aspects of rendering can be utilized to convey various facets of the cloud, while units can be rendered sequentially or with temporal overlap Visual rendering is provided in accordance with at least one embodiment of the invention. Here, audio-units (visually displayed as audio signals) can be arranged in the order of decreasing frequency of occurrence. A display size can correspond to a frequency of occurrence, with a particular arrangement reflecting a time of occurrence in the clip. Hovering/clicking on a unit can play a corresponding audio unit and also highlight its occurrence in the original audio. The visual rendering can also be arranged like a text tag cloud where instead of text, there are audio signals.

Cloud interaction, in accordance with at least one embodiment of the invention, can involve dynamically re-generating or modifying the rendering of the cloud based on user-inputs. A user can use gestures to indicate: part of the clip to be "clouded" (where "clouded" refers to generating an audio cloud for that part of the clip); audio from speaker (s) to be "clouded"; an audio unit to be recalled from the clip; sample gestures (e.g., left-right movement, nod, shake, frequency of taps). Visually, the cloud can be also be generated only for the audio portion displayed/selected on the screen.

Figure 4:
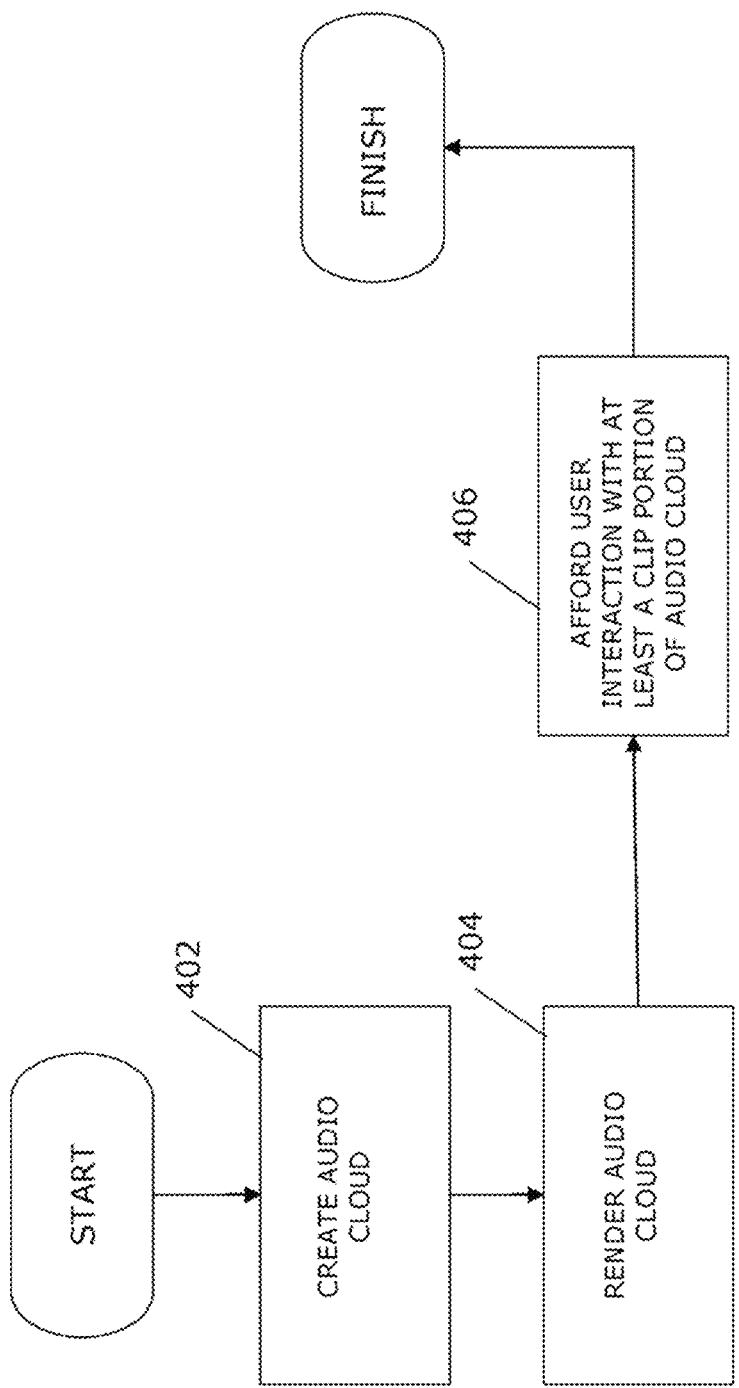
FIG. 4 sets forth a process more generally for effecting a cloud representation of audio content.

FIG. 4 sets forth a process more generally for effecting a cloud representation of audio content, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way a processing unit or units and system memory such as those indicated, respectively, at 16' and 28' in FIG. 5.

As shown in FIG. 4, in accordance with at least one embodiment of the invention, an audio cloud is created (402) and rendered (404), and user interaction with at least a clip portion of the audio cloud is afforded (406).

Figure 5:
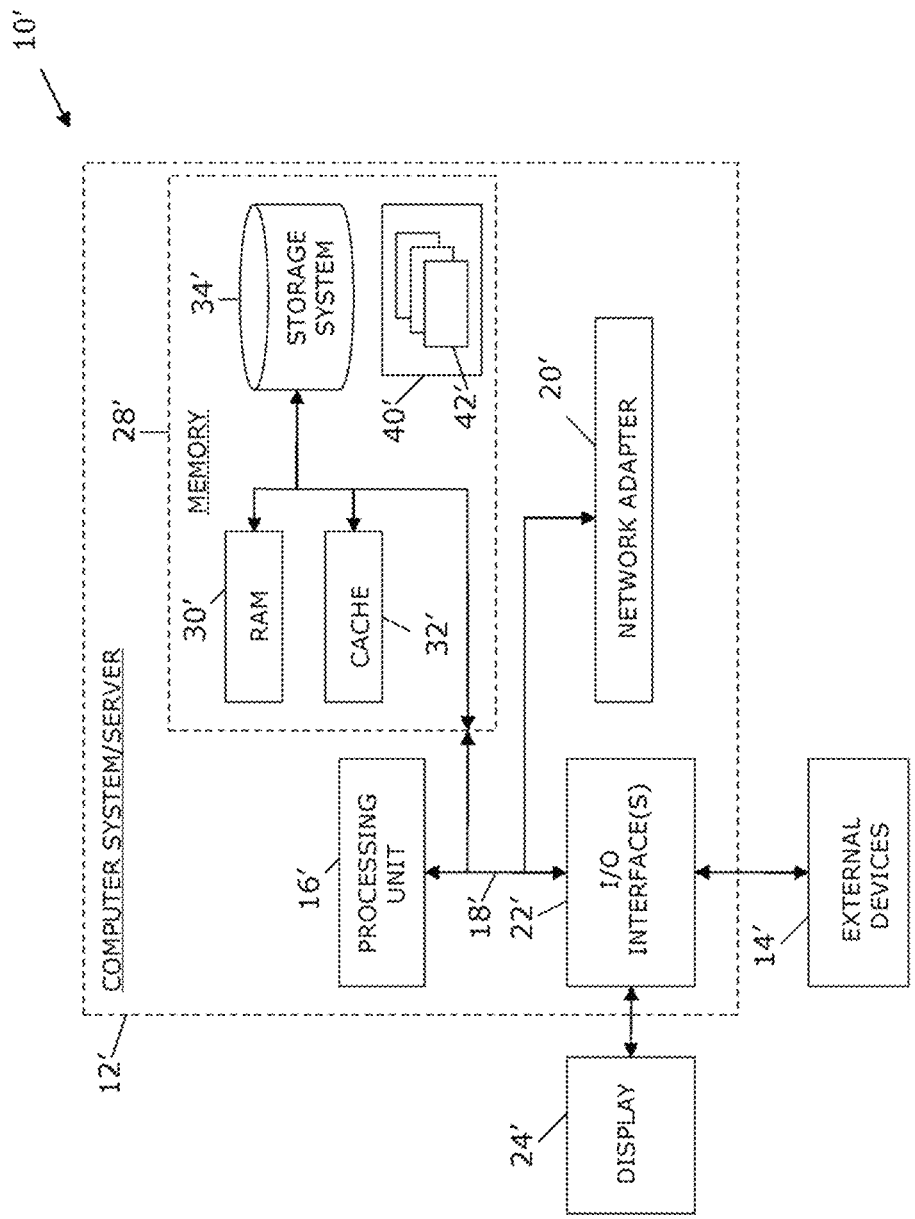
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:
1. A method comprising:
   segmenting audio provided in a first language not having available automatic speech recognition capabilities into speech units, wherein said segmenting comprises employing a language sub-word recognition technique selected from the group consisting of: a statistical system for sub-word unit recognition; a voice-activity-detection technique; and a syllable segmentation technique, wherein the language sub-word recognition technique comprises utilizing a sub-word recognition technique of a second language having available automatic speech recognition capabilities and different from the first language of the audio;
   identifying prominent speech units, wherein identifying comprises detecting a repeated speech unit by identifying speech patterns within the audio and using a language agnostic speech unit comparison technique, wherein the language agnostic speech unit comparison technique comprises a technique where a language associated with the speech unit is disregarded;
   wherein the identifying further comprises determining a frequency of occurrence of a speech unit and wherein a prominent speech unit comprises a speech unit that exceeds a predetermined frequency of occurrence threshold;
   creating an audio cloud comprising audio signals of the prominent speech units, wherein each of the audio signals comprise a playable audio unit that when played provides an audible output of the corresponding prominent speech unit;
   rendering the audio cloud, wherein the audio cloud comprises a visual representation of the audio signals, wherein the audio signals are arranged in order of decreasing frequency of occurrence and wherein a volume of the audio signals is based upon the frequency of occurrence; and affording user interaction with at least a clip portion of the audio cloud.

2. The method according to claim 1, comprising determining prominence of speech units.

3. The method according to claim 2, wherein said determining comprises determining at least one member selected from the group consisting of: frequency of speech units; spread of occurrence of speech units; distribution of speech units across at least one clip; and TF-IDF.

4. The method according to claim 1, wherein said segmenting comprises encoding audio para-lingual information in the units.

5. The method according to claim 1, wherein said rendering comprises at least one member selected from the group consisting of: audio-based rendering; and visual-display-based rendering.

6. The method according to claim 5, wherein said audio-based rendering comprises employing aspects of playback to convey aspects of the audio cloud.

7. The method according to claim 6, wherein the aspects of the audio cloud comprise at least one member selected from the group consisting of: a volume of rendered units corresponding to occurrence frequency in the clip portion; a representative unit rendered corresponding to a speaker who spoke that unit most often in the clip portion; a perceived location of the unit corresponding to a social-network closeness of a listener and a speaker; and a perceived direction of a rendered speech unit corresponding to a time of occurrence of the unit in the clip portion.

8. The method according to claim 5, wherein said visual-display-based rendering comprises employing aspects of visual order to convey aspects of the audio cloud.

9. The method according to claim 8, wherein the aspects of visual order comprise at least one member selected from the group consisting of: audio units visually displayed as audio signals; audio units visually arranged in an order of decreasing frequency of occurrence; a display size of an audio unit corresponding to a frequency of occurrence; a visual arrangement reflecting a time of occurrence of an audio unit in the clip portion; a highlighting of occurrence of an audio unit in the clip portion in response to clicking on a visual representation of an audio unit; and a tag cloud comprising a visual rendition of audio signals.

10. The method according to claim 1, wherein said creating and rendering steps are interactive based on user input.

11. The method according to claim 10, wherein said creating and rendering steps are modifiable in response to user input.

12. The method according to claim 11, wherein the user input includes at least one member selected from the group consisting of: a user gesture to indicate a part of the clip portion to be clouded; a user gesture to indicate an audio portion from a speaker to be clouded; and a user gesture for recalling an audio unit from the clip.

13. A method comprising:

inputting a rendered audio cloud at a user interface, wherein the audio cloud comprises a visual representation of audio signals represented as clip portions, wherein each of the audio signals comprise a playable audio unit that when played provides an audible output of the corresponding prominent speech unit, wherein the audio signals are arranged in order of decreasing frequency of occurrence, and wherein a volume of the audio signals is based upon the frequency of occurrence and the rendered audio cloud including:

speech units of a first language not having available automatic speech recognition capabilities detected via at least one a language sub-word recognition technique selected from the group consisting of: a statistical system for sub-word unit recognition, and a speech-analysis technique, wherein the language sub-word recognition technique comprises utilizing a sub-word recognition technique of a second language having available automatic speech recognition capabilities and different from the first language of the audio; and an identification of prominent speech units via detecting a repeated speech unit by identifying speech patterns within the audio and using a language agnostic speech unit comparison technique and wherein the identification comprises determining a frequency of occurrence of a speech unit and wherein a prominent speech unit comprises a speech unit that exceeds a predetermined frequency of occurrence threshold; and interacting with at least one of the clip portions of the audio cloud.

14. A method comprising:

segmenting audio provided in a first language not having available automatic speech recognition capabilities into speech units;

wherein segmenting comprises employing a language sub-word recognition technique selected from the group consisting of: a statistical system for sub-word unit recognition; a voice-activity-detection technique; and a syllable segmentation technique, wherein the language sub-word recognition technique comprises utilizing a sub-word recognition technique of a second language having available automatic speech recognition capabilities and different from the first language of the audio;

identifying, by employing a language-agnostic speech unit comparison technique, prominent speech units within the audio, wherein the language agnostic technique comprises a method where a language associated with the speech unit is disregarded, wherein the identifying comprises detecting a repeated speech unit by identifying speech patterns within the audio;

wherein the identifying further comprises determining a frequency of occurrence of a speech unit and wherein a prominent speech unit comprises a speech unit that exceeds a predetermined frequency of occurrence threshold;

creating an audio cloud comprising audio signals of the identified prominent speech units, wherein each of the audio signals comprise a playable audio unit that when played provides an audible output of the corresponding prominent speech unit;

rendering the audio cloud comprising a visual representation of the audio signals of the identified prominent units, wherein the audio signals are arranged in order of decreasing frequency of occurrence and wherein a volume of the audio signals is based upon the frequency of occurrence.

15. The method according to claim 14, wherein a language sub-word recognition technique comprises a speech analysis technique where accuracy of the technique is not dependant on a language and language characteristics of a speaker.

16. The method according to claim 14, wherein the audio signals within the rendered audio cloud are presented in an order based upon a prominence of the unit.

17. The method according to claim 14, wherein to identify prominent units comprises employing term frequency—inverse document frequency operations.

18. The method according to claim 14, comprising computer readable program code configured to detect speech units.

19. The method according to claim 14, wherein to render the audio cloud comprises a type of rendering selected from the group consisting of: audio-based rendering; and visual-display-based rendering.

* * * * *